US011184136B2

(12) United States Patent
Utkovski et al.

(10) Patent No.: US 11,184,136 B2
(45) Date of Patent: Nov. 23, 2021

(54) TRANSMISSION OF DATA BY MULTIPLE USERS OVER SHARED RESOURCES BASED ON STRUCTURED SUPERPOSITION CODING (71) Applicant: Fraunhofer-Gesellschaft zur Foerderung der angewandten Forschung e.V., Munich (DE)

(72) Inventors: Zoran Utkovski, Berlin (DE); Renato Luis Garrido Cavalcante, Berlin (DE); Martin Kasparick, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/778,381

(22) Filed: Jan. 31, 2020

(65) Prior Publication Data
US 2020/0169372 A1 May 28, 2020

Related U.S. Application Data (63) Continuation of application No. PCT/EP2018/070463, filed on Jul. 28, 2018.

(30) Foreign Application Priority Data

Jul. 31, 2017 (EP) .................................... 17184100

(51) Int. Cl.
*H04L 5/00* (2006.01)
*H04J 13/00* (2011.01)
(Continued)

(52) U.S. Cl.
CPC ........ *H04L 5/0053* (2013.01); *H04J 13/0077* (2013.01); *H04L 5/0023* (2013.01);
(Continued)

(58) Field of Classification Search
CPC ... H04L 1/0004; H04L 5/0005; H04L 5/0037; H04L 27/34; H04L 5/0055; H04L 5/0053;
(Continued)

(56) References Cited

U.S. PATENT DOCUMENTS

2010/0054353 A1* 3/2010 Roh ...................... H04L 1/0041
375/260
2013/0077466 A1* 3/2013 Takaoka .................. H04J 4/005
370/210

(Continued)

FOREIGN PATENT DOCUMENTS

WO 2016106728 A1 7/2016

OTHER PUBLICATIONS

Au, Kelvin, et al., "Uplink Contention Based SCMA for 5G Radio Access", IEEE 2013, XP055408025 ,6 pp.

(Continued)

*Primary Examiner* — Jung Liu
(74) *Attorney, Agent, or Firm* — Perkins Coie LLP; Michael A. Glenn (57) ABSTRACT A transmitter for transmitting data to a receiver of a wireless communication network is disclosed. The wireless communication network includes a plurality of resource elements, and at least a subset of the plurality of resource elements is shared by a plurality of transmitters for transmitting data from the plurality of transmitters to the receiver. The transmitter includes at least one antenna, an encoder and a transceiver coupled to the encoder and to the antenna. The encoder receives a data element to be transmitted to a receiver of the wireless communication network, and maps the data element to a codeword obtained by selecting at least one vector from a unique set of vectors. The unique set of vectors is exclusively assigned to the transmitter, and each vector includes a plurality of symbols. Each symbol is to be (Continued)

transmitted over a resource element of the wireless communication network. The transceiver transmits via the antenna the codeword on the subset of resource elements, the codeword representing the data element and identifying the transmitter at the receiver.

25 Claims, 5 Drawing Sheets

(51) Int. Cl.
*H04L 27/26* (2006.01)
*H04W 74/08* (2009.01)

(52) U.S. Cl.
CPC ...... *H04L 27/2613* (2013.01); *H04L 27/2628* (2013.01); *H04W 74/0833* (2013.01); *H04J 2013/0081* (2013.01)

(58) Field of Classification Search
CPC ... H04L 5/0048; H04L 5/0051; H04L 1/1812; H04L 27/26; H04L 1/1692; H04L 5/001; H04L 5/005; H04L 1/0026; H04L 27/2613; H04L 1/0625; H04W 74/08; H04W 88/02; H04W 76/27; H04W 74/00; H04W 72/1268; H04W 72/14
See application file for complete search history.

(56) References Cited

U.S. PATENT DOCUMENTS

| | | | | |
|---|---|---|---|---|
| 2014/0153625 | A1* | 6/2014 | Vojcic | G06F 11/1625 375/224 |
| 2015/0304076 | A1* | 10/2015 | Lee | H04L 5/005 370/329 |
| 2017/0126376 | A1* | 5/2017 | Wang | H04L 5/006 |
| 2017/0215201 | A1* | 7/2017 | Kim | H04L 1/1812 |
| 2018/0103442 | A1* | 4/2018 | Janse van Rensburg | H04W 52/247 |
| 2019/0150132 | A1* | 5/2019 | Bala | H04W 72/042 370/329 |
| 2019/0305877 | A1* | 10/2019 | Lee | H04W 74/08 |

OTHER PUBLICATIONS

Bertrad, Pierre, et al., "LTE—The UMTS Long Term Evolution: From Theory to Practice", [Uploaded in 2 parts] 2nd edition, John Wiley & Sons, 2011, Chapter 17, p. 371ff, pp. 371-406.

Dai, Linglong, et al., "Non-orthogonal multiple access for 5G: solutions, challenges, opportunities, and future research trends", IEEE Commun. Mag, vol. 53, No. 9, pp. 74-81, 2015, pp. 74-81.

Kim, Taeyoon, et al., "Multi-code multicarrier CDMA: performance analysis", IEEE 2004, XP010710081, pp. 973-977.

Nikopour, Hosein, et al., "Sparse code multiple access", Proc. IEEE PIMRC, London, pp. 332-336, Sep. 2013, XP055227113, pp. 332-336.

Rehman, Habib Ur, et al., "Multicode Multicarrier Interleave Division Multiple Access Communication", IEEE 2006, pp. 37-41, XP031085687, 2006, pp. 37-41.

Schotten, Hans Dieter, et al., "Adaptive multi-rate multi-code CDMA systems", IEEE Vehicular Technology Conference 1998, pp. 782-785, XP010287923, 1998, pp. 782-785.

Wang, Bichai, et al., "Joint User Activity and Data Detection Based on Structured Compressive Sensing for NOMA", IEEE Commun. Lett., vol. 20, No. 7, pp. 1473-1476, Jul. 2016, pp. 1473-1476.

Wang, Bichai, et al., "Dynamic Compressive Sensing-Based Multi-User Detection for Uplink Grant-Free NOMA", IEEE Commun. Lett., vol. 20, No. 11, pp. 2320-2323, Nov. 2016, pp. 2320-2323.

Zhang, Zhaoyang, et al., "Grant-free Rateless Multiple Access: A Novel Massive Access Scheme for Internet of Things", IEEE Communications Letters, vol. 20, Issue: 10, Oct. 2016, pp. 2019-2022, pp. 2019-2022.

* cited by examiner

ND DATA BY MULTIPLE
USERS OVER SHARED RESOURCES BASED
ON STRUCTURED SUPERPOSITION
CODING

CROSS-REFERENCE TO RELATED
APPLICATIONS

This application is a continuation of copending International Application No. PCT/EP2018/070463, filed Jul. 27, 2018, which is incorporated herein by reference in its entirety, and additionally claims priority from European Application No. 17184100.0, filed Jul. 31, 2017, which is also incorporated herein by reference in its entirety.

BACKGROUND OF THE INVENTION

The present invention relates to the field of wireless or wired communication networks or systems, more specifically to the access to such communication networks. Embodiments of the present invention concern the transmission of data by multiple users to a transmitter over shared resources using structured superposition coding.

Figure 1:
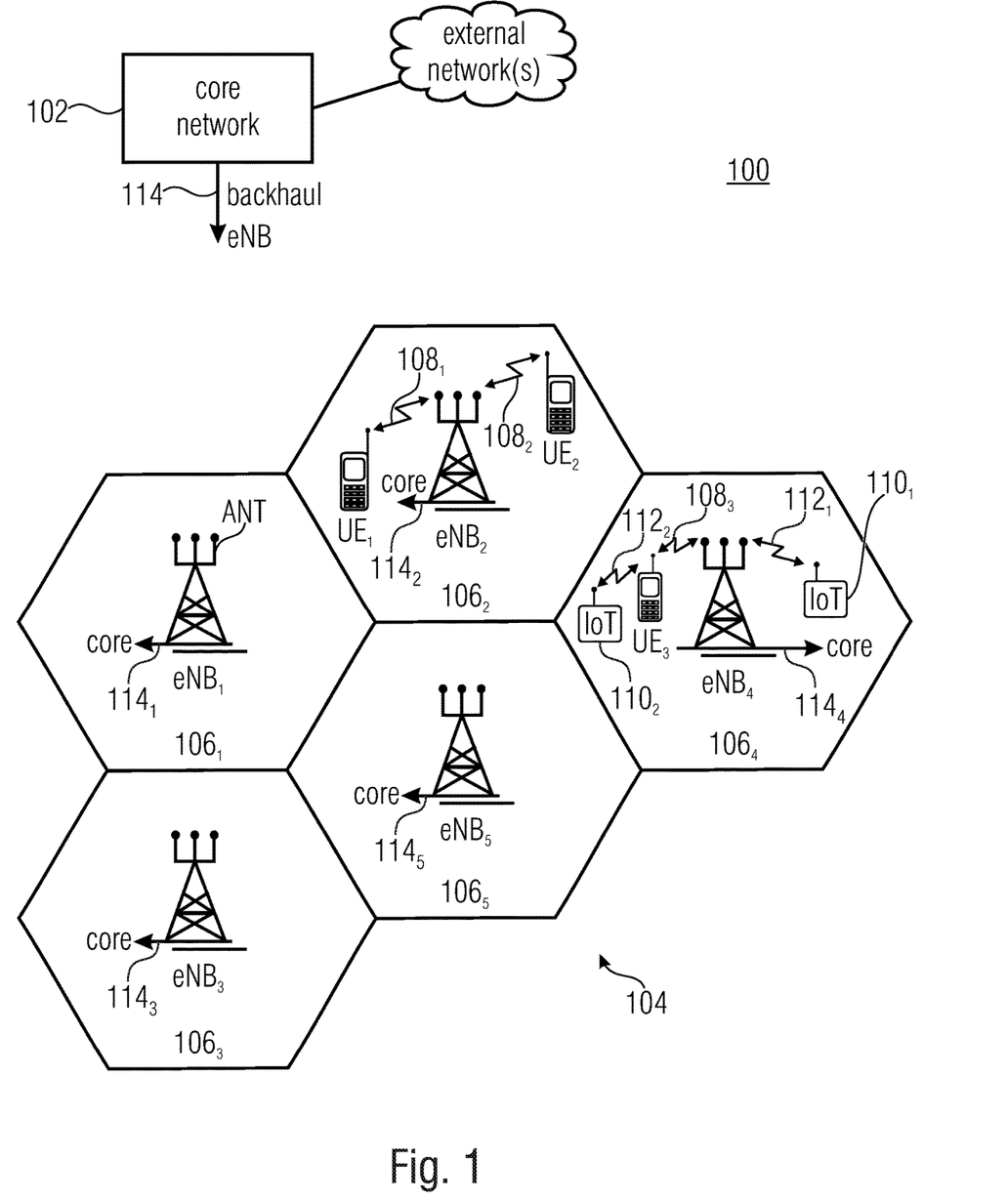
FIG. 1 shows a schematic representation of an example of a wireless communication system.

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ are connected to the core network 102 via respective backhaul links $114_1$ to $114_5$, which are schematically represented in FIG. 1 by the arrows pointing to the "core". The core network 102 may be connected to one or more external networks.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

The wireless communication system may be any single-tone or multicarrier system based on frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

Figure 2:
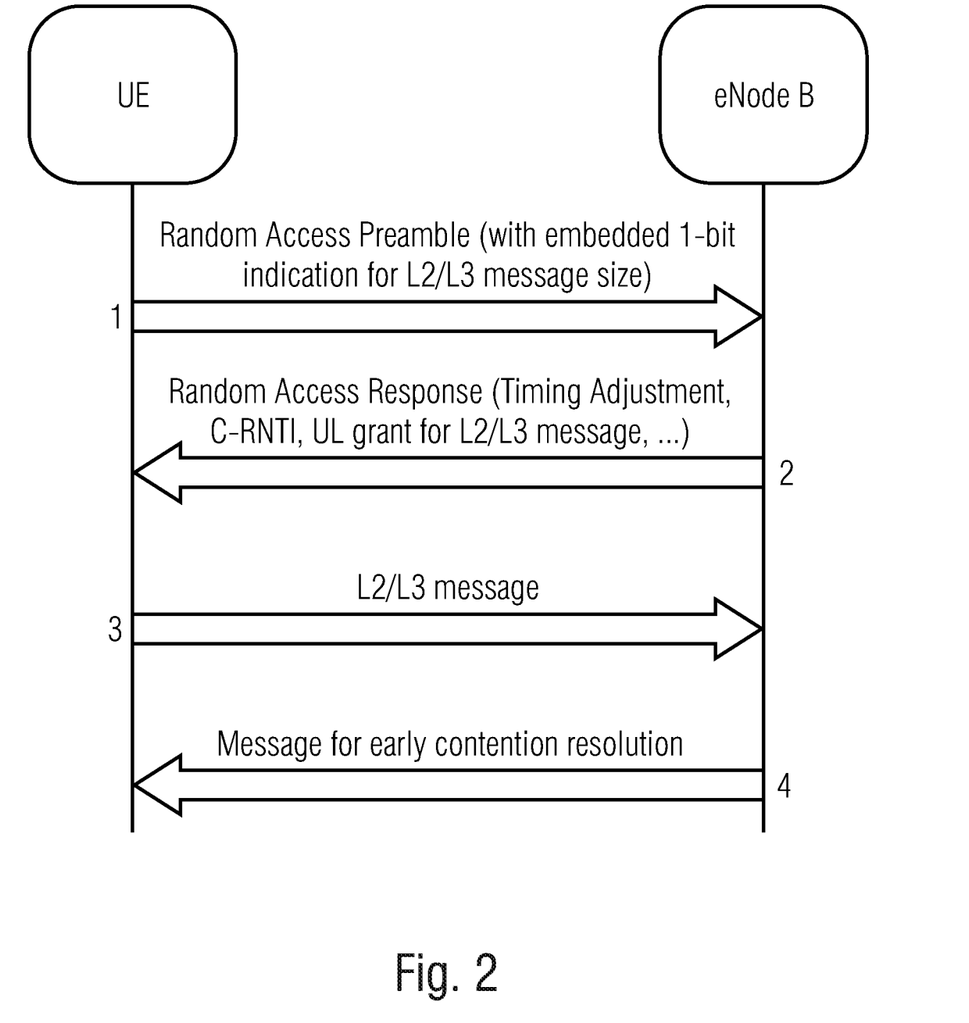
FIG. 2 is a signaling diagram for a successful contention-based random access procedure.

In wireless communication networks as described above with reference to FIG. 1, the uplink transmission is scheduled by an access point (AP), like a base station, using a request-grant procedure, i.e., the mobile device or user sends a scheduling request (SR) to the AP during a registration procedure. Then the AP performs scheduling to grant resources to users in a centralized manner. The request-grant procedure, i.e., the initial association of a user to the wireless communication network is performed in a contention based manner. The same mechanism may be used to re-establish a connection between the user and the AP upon a connection failure. A conventional contention-based random access procedure may include four steps, and FIG. 2 is a signaling diagram for a successful contention-based random access procedure as it is described, e.g., in reference [1]. Initially a preamble is transmitted by the user, UE, to the access point, eNB. Upon detection of the preamble by the eNB, a random access response is transmitted followed by two further messages, the L2/L3 message from UE to the eNB and a message, if needed, for early contention resolution from the eNB to the UE. However, in case the eNB does not detect the preamble, a timeout occurs at the UE, and the UE transmits a further random access sequence of the same preamble format again.

In the communication system, e.g., the system as described above with reference to FIG. 1, an increasing number of user devices may be present, like IoT devices, which may include a substantial number of always-online devices. Such devices may sporadically send small sized data packets, like senor readings, machine conditions, etc. Such numerous user devices may use the wireless communication network to support massive connections. As mentioned, the user devices may send short packages of data and any signaling overhead, when compared to the amount of data transmitted in the packet should be minimized, e.g., any overhead for signaling control data or the like. Other user devices may need to be served with extremely low latency so an immediate connection to the wireless network without time consuming registration procedures is entailed. Adopting the registration procedure described above with reference to FIG. 2 for such user devices results in an increased signaling overhead and/or in an increased system latency which may not be acceptable. Thus, in the presence of a high or massive number of user devices sporadically accessing a wireless communication system, like IoT devices, the contention-based random access procedure is associated with a sharp degradation in performance and large access delays, rendering it not practical. In other words, conventional access mechanisms, as the one described with reference to FIG. 2, are not capable to manage the access request from thousands of devices in a time-constraint system.

To address the above drawbacks associated with the registration procedure as described with reference to FIG. 2, grant-free access schemes have been discussed, like in reference [2] which describes a Rateless Multiple Access (RMA) scheme for the massive access of IoT devices or applications. After registration, each active user respectively transmits to the access point (AP) randomly responsive to a beacon signal broadcast by the AP indicating the start of the access period. Another grant-free access scheme is described in reference [3] referring to an uplink contention-based sparse code multiple access (SCMA) scheme.

In reference [2] each user has its own unique pseudo-random pattern for the access of REs, where it is assumed that number of active users is typically orders of magnitude smaller than the access pattern space. A potential disadvantage of this approach is that the assumption of the users applying a sparse pattern to share the resource elements may limit the total number of users admitted in the network, as well as the number of active users that can be simultaneously served. Reference [3], on the other hand proposes a contention-based approach which may entail a user to repeatedly retransmit the data until it is actually decoded, having the disadvantage of an overall latency of the latency.

Other known methods in the class of non-orthogonal multiple access schemes (NOMA) are described in references [4-7] and the references cited therein It is an object of the present invention to provide an approach improving the transmission of data by multiple of user devices over shared resources of a wireless communication network.

SUMMARY

According to an embodiment, a transmitter for transmitting data to a receiver of a wireless communication network, the wireless communication network including a plurality of resource elements, at least a subset of the plurality of resource elements shared by a plurality of transmitters for transmitting data from the plurality of transmitters to the receiver, may have: at least one antenna, an encoder configured to receive a data element to be transmitted to a receiver of the wireless communication network, and to map the data element to a codeword, the codeword obtained by selecting at least one vector from a unique set of vectors, the unique set of vectors exclusively assigned to the transmitter, each vector including a plurality of symbols, each symbol to be transmitted over a resource element of the wireless communication network, and a transceiver coupled to the encoder and to the antenna, the transceiver configured to transmit via the antenna the codeword on the subset of resource elements, the codeword representing the data element and identifying the transmitter at the receiver.

According to another embodiment, a receiver for receiving data from a plurality of transmitters of a wireless communication network, the wireless communication network including a plurality of resource elements, at least a subset of the plurality of resource elements provided shared by a plurality of transmitters for transmitting data from the plurality of transmitters to the receiver, may have: at least one antenna, a transceiver coupled to the antenna, the transceiver configured to receive via the antenna a receive signal on the subset of resource elements, the receive signal including a plurality of vectors from a plurality of transmitters, each vector including a plurality of symbols, each symbol transmitted over a resource element of the wireless communication network, and a decoder coupled to the transceiver, the decoder configured to obtain from the receive signal the plurality of vectors, a vector representing a codeword from a certain transmitter, the vector selected from a unique set of vectors exclusively assigned to the certain transmitter, the unique sets of vectors of the plurality of transmitters being known at the receiver, and to de-map the codewords to data elements associated with the respective transmitters on the basis of the known unique sets of vectors of the plurality of transmitters.

According to another embodiment, a wireless communication network may have: a plurality of inventive transmitters as mentioned above, and an inventive receiver as mentioned above, wherein the signals from the plurality of transmitters are multiplexed and transmitted to the transmitter over shared resources of the wireless communication network.

According to still another embodiment, an apparatus for encoding data elements a transmission from a transmitter to a receiver of a wireless communication network, the wireless communication network including a plurality of resource elements, at least a subset of the plurality of resource elements shared by a plurality of transmitters for transmitting data from the plurality of transmitters to the receiver, may have: a storage device holding a unique set of vectors, the unique set of vectors exclusively assigned to the transmitter, each vector including a plurality of symbols, each symbol to be transmitted over a resource element of the wireless communication network, and an encoder to form a codeword representing a data element to be transmitted, each codeword defined by a vector or by a linear combination of vectors selected from the unique set of vectors.

According to another embodiment, a method for transmitting data from a transmitter to a receiver of a wireless communication network, the wireless communication network including a plurality of resource elements, at least a subset of the plurality of resource elements shared by a plurality of transmitters for transmitting data from the plurality of transmitters to the receiver, may have the steps of: receiving a data element to be transmitted to the receiver of the wireless communication network, mapping the data element to a codeword, the codeword obtained by selecting at least one vector from a unique set of vectors, the unique set of vectors exclusively assigned to the transmitter, each vector including a plurality of symbols, each symbol to be transmitted over a resource element of the wireless communication network, and transmitting the codeword on the subset of resource elements, the codeword representing the data element and identifying the transmitter at the receiver.

According to another embodiment, a method for receiving data from a plurality of transmitters at a receiver of a wireless communication network, the wireless communication network including a plurality of resource elements, at least a subset of the plurality of resource elements shared by a plurality of transmitters for transmitting data from the plurality of transmitters to the receiver, may have the steps of: receiving a receive signal on the subset of resource elements, the receive signal including a plurality of vectors from a plurality of transmitters served by the receiver, each vector including a plurality of symbols, each symbol transmitted over a resource element of the wireless communication network, obtaining from the receive signal the plurality of vectors, a vector representing a codeword from a certain transmitter, the vector selected from a unique set of vectors exclusively assigned to the certain transmitter, the unique sets of vectors of the plurality of transmitters being known at the receiver, and de-mapping the codewords to data elements associated with the respective transmitters on the basis of the known unique sets of vectors of the plurality of transmitters.

Another embodiment may have a non-transitory digital storage medium having stored thereon a computer program for performing a method for transmitting data from a transmitter to a receiver of a wireless communication network, the wireless communication network including a plurality of resource elements, at least a subset of the plurality of resource elements shared by a plurality of transmitters for transmitting data from the plurality of transmitters to the receiver, having the steps of: receiving a data element to be transmitted to the receiver of the wireless communication network, mapping the data element to a codeword, the codeword obtained by selecting at least one vector from a unique set of vectors, the unique set of vectors exclusively assigned to the transmitter, each vector including a plurality of symbols, each symbol to be transmitted over a resource element of the wireless communication network, and transmitting the codeword on the subset of resource elements, the codeword representing the data element and identifying the transmitter at the receiver, when said computer program is run by a computer.

Still another embodiment may have a non-transitory digital storage medium having stored thereon a computer program for performing a method for receiving data from a plurality of transmitters at a receiver of a wireless communication network, the wireless communication network including a plurality of resource elements, at least a subset of the plurality of resource elements shared by a plurality of transmitters for transmitting data from the plurality of transmitters to the receiver, having the steps of: receiving a receive signal on the subset of resource elements, the receive signal including a plurality of vectors from a plurality of transmitters served by the receiver, each vector including a plurality of symbols, each symbol transmitted over a resource element of the wireless communication network, obtaining from the receive signal the plurality of vectors, a vector representing a codeword from a certain transmitter, the vector selected from a unique set of vectors exclusively assigned to the certain transmitter, the unique sets of vectors of the plurality of transmitters being known at the receiver, and de-mapping the codewords to data elements associated with the respective transmitters on the basis of the known unique sets of vectors of the plurality of transmitters, when said computer program is run by a computer.

BRIEF DESCRIPTION OF THE DRAWINGS

Embodiments of the present invention are now described in further detail with reference to the accompanying drawings, in which.

DETAILED DESCRIPTION OF THE INVENTION

In the following, embodiments of the present invention are described in further detail with reference to the enclosed drawings in which elements having the same or similar function are referenced by the same reference signs.

In accordance with embodiments the present invention provides a transmitter, like a UE, for transmitting data to a receiver, like a base station, of a wireless communication network. The wireless communication network includes a plurality of resource elements, and at least a subset of the plurality of resource elements is shared by a plurality of transmitters for transmitting data from the plurality of transmitters to the receiver. The transmitter includes at least one antenna, an encoder and a transceiver coupled to the encoder and to the antenna. The encoder is configured to receive a data element to be transmitted to a receiver (BS) of the wireless communication network, and to map the data element to a codeword. The codeword is obtained by selecting at least one vector from a unique set of vectors. The unique set of vectors is exclusively assigned to the transmitter, and each vector includes a plurality of symbols. Each symbol is to be transmitted over a resource element of the wireless communication network. The transceiver is configured to transmit via the antenna the codeword on the subset of resource elements, and the codeword represents the data element and identifies the transmitter at the receiver.

In accordance with embodiments, the present invention provides a receiver, like a base station, for receiving data from a plurality receivers, like UEs, of a wireless communication network. The wireless communication network includes a plurality of resource elements, and at least a subset of the plurality of resource elements is shared by a plurality of transmitters for transmitting data from the plurality of transmitters to the receiver. The receiver includes at least one antenna, a transceiver coupled to the antenna and a decoder coupled to the transceiver. The transceiver is configured to receive via the antenna a receive signal on the subset of resource elements. The receive signal includes a plurality of vectors from a plurality of transmitters, and each vector includes a plurality of symbols. Each symbol is transmitted over a resource element of the wireless communication network. The decoder is configured to obtain from the receive signal the plurality of vectors. A vector represents a codeword from a certain transmitter, and the vector is selected from a unique set of vectors exclusively assigned to the certain transmitter. The unique sets of vectors of the plurality of transmitters is known at the receiver. The decoder is further configured to de-map the codewords to data elements associated with the respective transmitters (UEs) on the basis of the known unique sets of vectors of the plurality of transmitters (UEs).

Embodiments of the inventive approach provide a communication network including one or more of the receivers, like UEs, implemented in accordance with the inventive approach, as well as one or more transmitters, like base stations, implemented in accordance with the inventive approach.

In accordance with embodiments, the present invention provides an apparatus for encoding data elements for a transmission from a transmitter to a receiver of a wireless communication network. The wireless communication network includes a plurality of resource elements, and at least a subset of the plurality of resource elements is shared by a plurality of transmitters for transmitting data from the plurality of transmitters to the receiver. The apparatus includes a storage device, like a memory, for holding a unique set of vectors, the unique set of vectors exclusively assigned to the transmitter, each vector including a plurality of symbols, each symbol to be transmitted over a resource element of the wireless communication network, and an encoder to form a codeword representing a data element to be transmitted, each codeword defined by a vector or by a linear combination of vectors selected by the encoder from the unique set of vectors.

In accordance with the inventive approach a massive access scheme is provided which addresses the drawbacks of known massive access schemes. In accordance with embodiments of the present invention, a communication scheme is taught which allows the UEs to simultaneously perform initial access and communicate information to a joint receiver, like a base station, by linearly combining sequences from a predefined set of sequences, wherein each of the UEs has associated therewith a unique set of sequences. The present invention provides a communication scheme implementing a random access and multiple access technology that may be used in wireless communication networks, for example a 5G network. The inventive communication scheme
- improves the throughput of a wireless network and enable grant-free or grant-less UL (uplink), DL (downlink), D2D (device-to-device) or M2M (machine-to-machine) transmissions,
- allows transmitting short packages with a small overhead,
- allows accommodating a large number of communication devices, like mobile users, machine-type devices, vehicles etc.,
- decreases latency in a random access scenario by performing joint user identification and data transmission,
- provides non-coherent data transmission without instantaneous transmit/receive channel knowledge,
- provides a new class of random access and multi-access schemes,
- provides a design methodology for structured superposition codes,
- provides a compressive sensing based algorithm for code detection, provides an EXIT (extrinsic information transfer) chart evaluation methodology.

Further, in accordance with embodiments, the present invention provides an encoding/decoding scheme lending itself to a receiver implementation based on message passing, that may be based on a belief propagation (BP) algorithm to recover to the original information from a received signal.

In accordance with embodiments, the inventive approach may include a registration of the UE at the network, e.g., a RACH process during which the UE is informed about the shared resources to be used for the random access to network. For example, the transmitter, like a UE, may register with the wireless communication network when establishing or re-establishing a connection to the wireless communication network, and responsive to the registration, the UE receives information indicating the shared resources. In such embodiments, the receiver, like a BS may use only the unique sets of vectors of those UEs that registered with the wireless communication network. In other words, during the de-mapping process, rather than searching all known unique sets of vectors, the BS may limit the search space to a subset of unique sets of vectors for those UEs actually registered. This is also referred to as activity pattern indicating the active UEs as due to the registration, the BS is aware of the UEs which are actually active and transmit data. This embodiment is advantageous as only those UEs actually sending data are considered at the BS, thereby improving the processing of the received signal and expediting the decoding process.

In accordance with yet further embodiments, one or more of the transmitters, like the UEs, may have associated therewith an activation pattern which indicates a probability of activation of the UE during a predefined time period, e.g., during a frame. The activation pattern is known at the BS and is exploited during the de-mapping process. The BS may access the unique sets of vectors, associated with all or only the active UEs, according to the probabilities of activation of the transmitters (UE), e.g., starting with the highest probability. This embodiment is advantageous as the BS will start with the de-mapping for those UEs that are most likely to send data during the current frame, thereby improving the processing of the received signal and expediting the decoding process.

In accordance with yet other embodiments, the inventive approach does not require a registration of the UEs. These embodiments may provide for a grant-free massive random access of the UEs. In such embodiments, the UEs are aware of the shared resources, and access the wireless communication network when establishing or re-establishing a connection to the wireless communication network for the transmission of data without performing a registration procedure, e.g., access to the network and transmission of data occurs simultaneously. As mentioned above, a fundamental network function is random access, which is carried out by users, also referred to as user equipments (UEs), when first accessing the system. Embodiments of the inventive approach are directed to random access approaches for handling an increased number of UEs expected to be in operation in wireless communication networks. For example, in the upcoming 5G network, a massive number of UEs related to Internet-of-Things (IoT) applications is expected, which may sporadically access the wireless channel to transmit data. Contention-free, orthogonal multiple access protocols, such as TDMA, (O)FDMA etc., do not meet the requirements to handle such devices because the resources are assigned to the users in a fixed and centralized manner. This, inevitably, results in a large signaling overhead, high realization complexity and low overall system efficiency. Contention-based mechanisms, such as ALOHA/slotted ALOHA, on the other hand, suffer from throughput degradation in the presence of a large number of users due to the delay associated with the back off/retransmission mechanisms implemented by these schemes.

Furthermore, the embodiments of the inventive approach based on structured superposition coding allows for a receiver implementation based on relaxed belief propagation, such as approximate message passing. The low-complexity receiver implementation also provides an advantage over other methods in the class of non-orthogonal multiple access schemes (NOMA) such as the ones described in references [4-7] and the references cited therein. In addition, in accordance with embodiments, the inventive scheme does not require channel knowledge, except for second order statistics, at neither the transmitter nor at the receiver side. This is particularly attractive in massive, random access and multiple access applications where reliable channel estimation may be very challenging, if at all feasible.

Embodiments of the present invention may be implemented in a wireless communication system as depicted in FIG. 1 including base stations, users, like mobile terminals or IoT devices.

Figure 3:
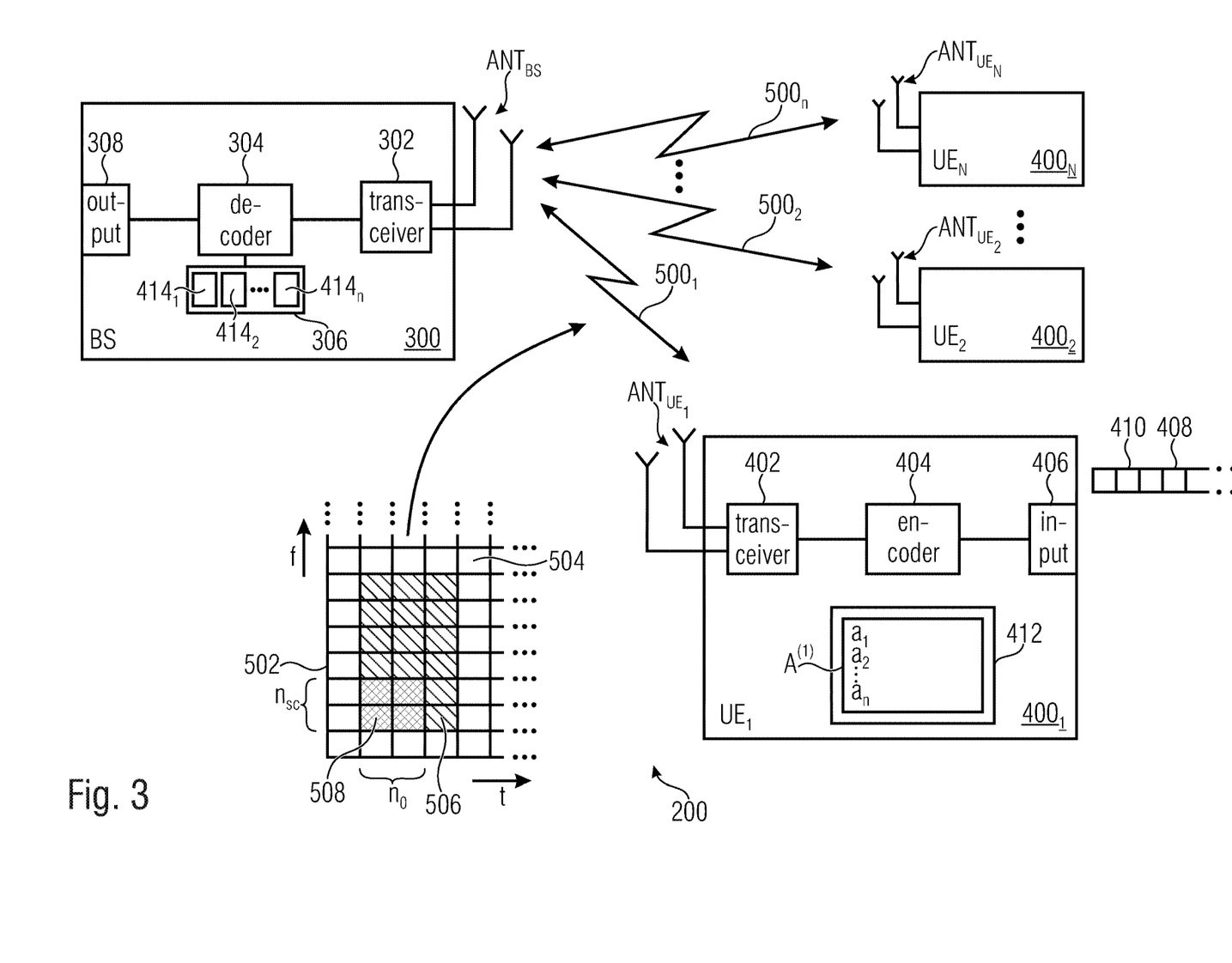
FIG. 3 is a schematic representation of a wireless communication system for transmitting information between a transmitter to a receiver in accordance with an embodiment of the present invention.

FIG. 3 is a schematic representation of a wireless communication system 200 for communicating information between a base station 300 and a plurality of UEs $400_1$-$400_N$ and operating in accordance with embodiments of the inventive approach described herein. The base station 300 and the UEs $400_1$-$400_N$ may include one or more antennas $ANT_{BS}$, $ANT_{UE}$ or an antenna array having a plurality of antenna elements. As is schematically indicated by the arrows $500_1$-$500_N$ signals are communicated between the bases station 300 and the UEs $400_1$-$400_N$ via a wireless communication link, like a radio link. For transmitting data or information, the wireless communication system 200 may use a physical resource grid 502 as described above and as it is used, e.g. in an OFDM-based system. The physical resource grid may comprise resource elements 504 to which physical signals may be mapped. The physical resource grid may comprise a frame having a certain duration, like 10 milliseconds, in the time domain and having a given bandwidth in the frequency domain. The frame may have a certain number of subframes of a predefined length. Each subframe may include two slots of 6 or 7 OFDM symbols.

In accordance with embodiments, within the physical resource grid provided by the wireless communication system 200 for the data communication, like a LTE system, a subset 506 of the resource elements 504 may be used for the inventive massive random access scheme. The resource elements 504, more generally the resources assigned for implementing massive random access scheme are known by the base station 300 and the UEs $400_1$-$400_N$. In accordance with other embodiments, the wireless communication system 200 may be for exclusively serving UEs using the inventive massive random access scheme, e.g., sensor networks or networks linking machines in a factory. Such a wireless communication system 200 may operate on dedicated resources and all of the resources of such a system 504 may be used for the inventive massive random access scheme.

In the following, the structure and operation of the UE $400_1$ will be described in more detail. It is noted that the remaining UEs $400_2$-$400_N$ may have the same or a similar structure and operate in the same or in a similar way as UE $400_1$. The UE $400_1$ includes the one or more antennas $ANT_{UE}$, a transceiver $402_1$ coupled to the antenna $ANT_{UE}$, an encoder $404_1$ and an input $406_1$. At the input $406_1$ the UE $400_1$ receives a data stream $408_1$ which may include a plurality of data elements $410_1$ to be transmitted from the UE $400_1$ to the base station 300. The encoder $404_1$ receives the data element $410_1$ and maps it to a codeword. The UE $400_1$, in accordance with embodiments, may include a storage device $412_1$, like a memory, which stores a unique set A of K-dimensional vectors (K is the number of resource elements at disposal) $a_1, \ldots, a_M$ exclusively assigned to the UE $400_1$. Responsive to the data elements $410_1$ to be encoded, the encoder $404_1$ selects at least one vector from the unique set A of vectors to obtain the codeword s representing the data elements or data to be transmitted. The information carried by the codeword s is contained in the choice of the vectors to be linearly combined into a subset of the vectors from the set A, rather than the elements (i.e. the entries) of the resulting K-dimensional signal vector s. By directly encoding the data to a linear combination of multi-dimensional vectors, the structured superposition encoding techniques described herein circumvent explicit symbol mapping as in conventional RF digital modulation, and may thus be seen as a form of high-dimensional coded modulation. As the design of the vector sequences $a_1, \ldots, a_M$ is left unspecified, it is also not excluded that the individual vector elements are built from a finite-dimensional constellation resembling RF digital modulation such as QPSK (four possible symbol states), 16-QAM (16 symbols states), or 64-QAM (64 symbols states). The transceiver $402_1$ is coupled to the encoder $404_1$ and to the antenna $ANT_{UE}$ to transmit via the antenna $ANT_{UE}$ the codeword on the subset 504 of resource elements 502. The codeword formed of the one or more vectors $a_1, \ldots, a_M$ not only represents the data element, but also identifies the UE $400_1$ at the base station 300, because of the unique set A of vectors exclusively assigned to the UE $400_1$. In other words, the base station 300 receiving codewords formed of vectors may distinguish and identify the UEs as each of the UEs uses one or more vectors that are used exclusively (only) by the respective UE, i.e., there is no vector that is used by two or more UEs. The inventive massive random access scheme allows the UEs $400_1$-$400_N$ to simultaneously perform an initial access and communicate information to the base station 300.

In accordance with embodiments, the codeword may be obtained by linearly combining a plurality of the vectors, also referred to as sequences, from the unique or predefined set A exclusively associated with each of the UEs. For example, when active, each UE $400_1$-$400_N$ transmits its vector of complex symbols over a resource block (RB) 508 including nRB resource elements (REs) 504, which may be time-frequency slots. For example, in an OFDM-based system, the RB 508 may include $n_O$ OFDM symbols in the time domain, each symbol spanning $n_{SC}$ subcarriers in the frequency domain. Hence the RB 508 includes a total of $n_{RB}=n_O \cdot n_{SC}$ resource elements, where $n_O$ is related to the RB duration, and $n_{SC}$ is related to the associated bandwidth.

The above described approach for encoding data to be transmitted over resources shared by a plurality of UEs may be implemented in scenarios using a registration process of the UEs at the network or at the base station, e.g., a RACH-like process, as well as in scenarios not requiring such a registration process so as to allow, for example, a grant-free massive random access of the UEs.

In accordance with one embodiment, the UE registers itself with the network and is informed about the shared resources to be used for the random access to network. The UE may register with the wireless communication network when establishing or re-establishing a connection to the wireless communication network. Due to the registration, the base station is actually aware of those UEs from the plurality of possible UEs which are actually active and transmit data. This is also referred to as activity pattern indicating the active UEs. The base station will use only the unique sets of vectors of those UEs that registered with the wireless communication network. In other words, during the de-mapping process, rather than searching all known unique sets of vectors, the base station may limit the search space to a subset of unique sets of vectors for those UEs actually registered. This embodiment is advantageous as only those UEs actually sending data are considered at the base station, thereby improving the processing of the received signal and expediting the decoding process. The activity pattern of the UEs $400_1$-$400_N$, also referred to as user activity pattern, is known at the base station, and the UEs $400_1$-$400_N$ use the shared resources 506 by multiplexing layers from the respective active UEs. The multiplexed layers may include any layer over which multiple data streams may be communicated using shared resources of a network, like MIMO spatial layers, OFDMA tones, TDMA layers and others.

In accordance with another embodiment, the UE does not register with the network or base station but sends the data as it accesses the base station, thereby providing a grant-free massive random access of the UEs. The UEs are aware of the shared resources, e.g., they are defined by the network specification, and the UEs access the wireless communication network when establishing or re-establishing a connection to the wireless communication network for the transmission of data without performing a registration procedure, e.g., access to the network and transmission of data occurs simultaneously. In accordance with other embodiments a point-to-point channel between the base station and the UEs may be provided and the communication or transmission of the information may include a superposition of the vectors from the different users obtained from the respective predefined or unique sets A of vectors.

In accordance with an embodiment, a system as described with reference to FIG. 3 is considered in which the N UEs $400_1$-$400_N$ are present, and it is assumed that the $n^{th}$ UE transmits information by linearly combining vectors or sequences from the unique set of vectors, which may be represented as $\mathbb{A}^{(n)} = \{a_1^{(n)}, \ldots, a_{M_n}^{(n)}\}$ of size $M_n$, where the superscript $(\cdot)^{(n)}$ is used to denote the $n^{th}$ UE.

Figure 4:
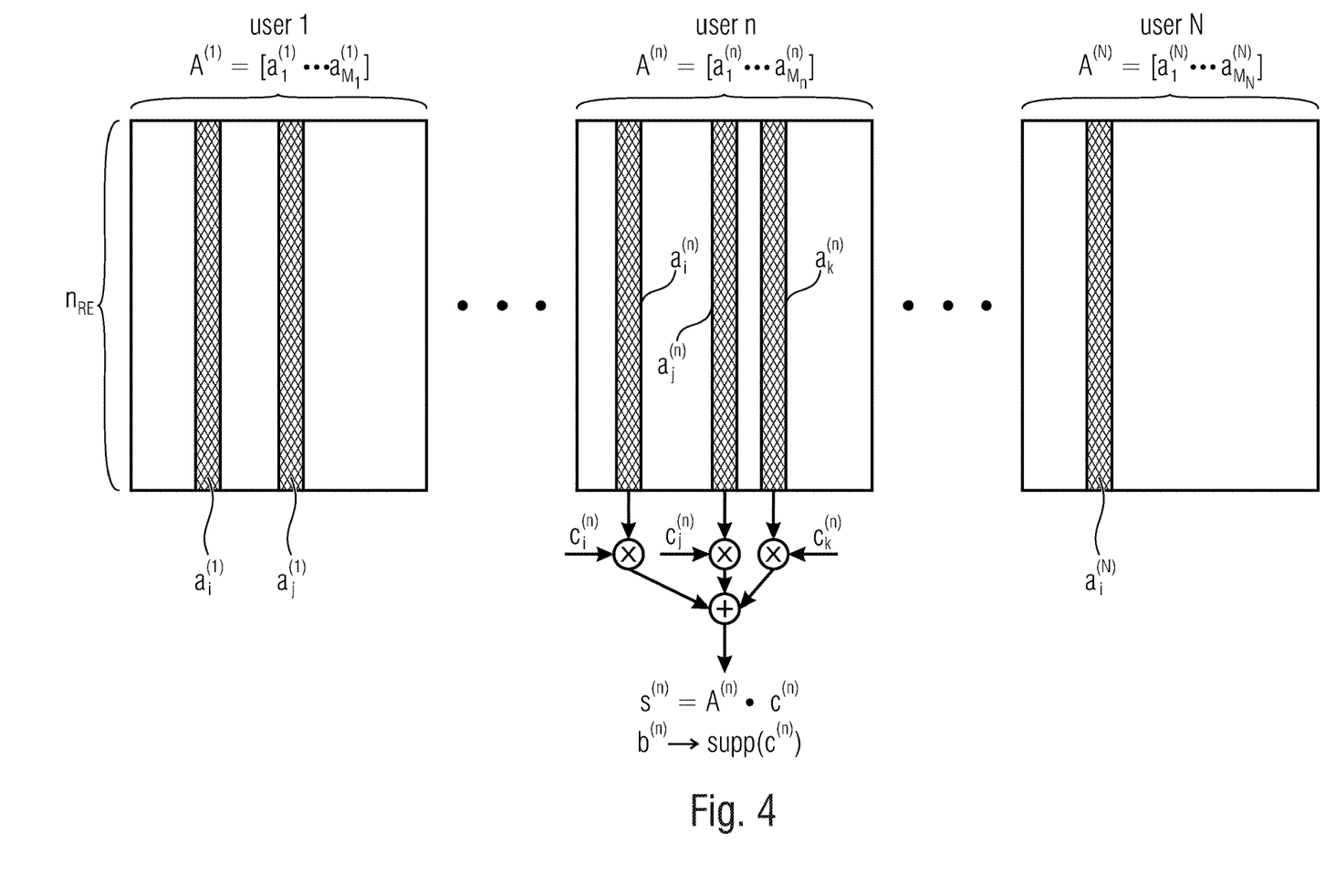
FIG. 4 illustrates an example of an encoding process in accordance with embodiments of the present invention, and an example for mapping from the binary information message to the transmitted vector in accordance with embodiments of the present invention.

When active, the $n^{th}$ UE transmits over K channel resource elements the K-dimensional complex vector $s^{(n)}$ represented by the linear combination:

$$s^{(n)} = A^{(n)} c^{(n)},$$

where the columns of the matrix $A^{(n)}$ stack the vectors $a_1^{(n)}, \ldots, a_{M_n}^{(n)}$ horizontally, and the elements of the vector $c^{(n)}$ are complex-valued coefficients. The information to be transmitted by the $UE_n$ is conveyed by the vector $s^{(n)}$ to the common receiver, like the base station 300. The actual information is defined by the way in which the K-dimensional vectors $a_1^{(n)}, \ldots, a_{M_n}^{(n)}$ of the set $\mathbb{A}^{(n)}$ are combined to create the transmit vector $s^{(n)}$. In other words, the information is encoded in the support (the position of the non-zero elements of $c^{(n)}$), i.e. in the way the vector $c^{(n)}$ selects the columns of the matrix $A^{(n)}$, rather than in the complex symbols (elements) of the vector $s^{(n)}$. This is illustrated in FIG. 4 showing an example of the encoding process in accordance with embodiments of the present invention. FIG. 4 shows in the center the user n having the unique set $\mathbb{A}^{(n)}$ of the vectors $a_1^{(n)}, \ldots, a_{M_n}^{(n)}$. Each of the vectors $a_1^{(n)}, \ldots, a_{M_n}^{(n)}$ defines a complex symbol using a number $n_{RE}$ of resource elements. In the case illustrated in FIG. 4, user n selects from its set $\mathbb{A}^{(n)}$ the three vectors $a_i^{(n)}, a_j^{(n)}, a_k^{(n)}$ using the vector $c^{(n)}$ of which only the elements $c_i^{(n)}, c_j^{(n)}, c_k^{(n)}$ are non-zero entries. All other elements of the vector $c^{(n)}$ are zeros, thereby not selecting a corresponding vector (the other mon-selected vectors are not shown in the Fig.). Thus, when active, a user, like user n, transmits information by linearly combining the sequences or vectors from the unique set $\mathbb{A}^{(n)}$. The information sequence $b^{(n)}$ is encoded in the support (non-zero elements) of $c^{(n)}$, $b^{(n)} \to \text{supp}(c^{(n)})$. In the example of FIG. 4, user 1 combines two vectors $a_i^{(1)}, a_j^{(1)}$ using a he vector $c^{(1)}$ (not shown), and user N uses only a single vector $a_i^{(N)}$ using the vector $c^{(N)}$.

Further with reference to FIG. 4 the mapping from the binary information message $b^{(n)}$ to the transmitted vector $s^{(n)}$ in accordance with embodiments of the present invention is illustrated. In the example depicted in FIG. 4, it is assumed that the unique set of vectors or sequences user n includes $M_n = 6$ sequences, i.e., the user n has $M_n = 6$ sequences on disposal, $\mathbb{A}^{(n)} = \{a_1^{(n)}, \ldots, a_{M_6}^{(n)}\}$. As is shown in FIG. 4, each of the $M_n = 6$ sequences spans a predefined number $n_{RE}$ of resource elements. The vector $s^{(n)}$, which is the transmit codeword $s^{(n)}$, is constructed by linearly combining two (out of six possible) sequences, yielding $$\binom{6}{2} = 15$$

different ways in which the two seqences can be selected. When indexing the transmit codewords $s_1^{(n)}, \ldots, s_{15}^{(n)}$ according to the positions of the non-zero elements of the vector $c^{(n)}$, where $s^{(n)} = \sum_{i=1}^{6} c_i^{(n)} a_i^{(n)}$, the following is obtained:

| $b^{(n)}$ | $\to$ | $\text{supp}(c^{(n)})$ | $\to$ | $s^{(n)}$ |
|---|---|---|---|---|
| 0001 | $\to$ | 000011 | $\to$ | $s_1^{(n)} = c_5^{(n)} a_5^{(n)} + c_6^{(n)} a_6^{(n)}$ |
| 0010 | $\to$ | 000101 | $\to$ | $s_2^{(n)} = c_4^{(n)} a_4^{(n)} + c_6^{(n)} a_6^{(n)}$ |
| 0011 | $\to$ | 000110 | $\to$ | $s_3^{(n)} = c_4^{(n)} a_4^{(n)} + c_5^{(n)} a_5^{(n)}$ |
| $\vdots$ | | $\vdots$ | | $\vdots$ |
| 1111 | $\to$ | 110000 | $\to$ | $s_{15}^{(n)} = c_1^{(n)} a_1^{(n)} + c_2^{(n)} a_2^{(n)}$ |

The message $b^{(n)} = 0000 \to 000000 \to s_{15}^{(n)} = 0$ may be interpreted as "user n not active".

In accordance with embodiments, inactive users may be modeled by transmitting an all-zero sequence $s^{(n)} = 0$. This pre-defined sequence used by all UEs is considered at the base station 300 as separate codeword that appears with a probability determined by the UEs traffic/activation pattern, i.e. by the individual probabilities $p_1, \ldots, p_N$ of activation (within one frame) for each of the N UEs. The individual probabilities of user activation are known to the receiver and are used in the detection process.

In accordance with further embodiments, the vector $c^{(n)}$ may be structured such that it selects up to/columns from the matrix $A^{(n)}$, with $0 < l \leq M_n$, i.e., up to/sequences or vectors are linearly combined from the set $\mathbb{A}^{(n)}$. The transmission rate of the $UE_n$ is determined by the positions and the number of non-zero coefficients in the vector $c^{(n)}$. For example, when considering a specific situation where l=1, i.e., the linear combination of vectors includes only a single vector, the data rate is $R_n = \log_2 M_n$.

In accordance with a more specific definition, the columns of the matrix $A^{(n)}$ may be selected as follows:

$$c^{(n)} = G^{(n)} b^{(n)},$$

where $G^{(n)}$ is a generator matrix of a linear code associated with the $UE_n$, and $b^{(n)}$ is the vector of the information bits.

To distinguish between active and inactive UEs, for an active UEn $c^{(n)} \neq 0$ holds, i.e., any all-zero vector is considered invalid.

In the embodiment of FIG. 3, the base station 300 includes the one or more antennas $ANT_{TX}$, a transceiver 302 coupled to the antenna $ANT_{TX}$ and a decoder 304 coupled to the transceiver 302. The transceiver 302 receives via the antenna $ANT_{TX}$ a receive signal on the subset 506 of resource elements 504. The receive signal includes the vectors or combinations of vectors from the UEs $400_1$-$400_N$. The decoder 304 obtains from the receive signal the plurality of vectors and de-maps or decodes the codewords to data elements associated with the respective UEs using the known unique sets of vectors of the plurality of UEs. The base station 300, in accordance with embodiments, may include a storage device 306, like a memory, which stores the unique sets $\mathbb{A}^{(n)}$ (i.e. matrices $\mathbb{A}^{(n)}$) for all of the UEs $400_1$-$400_N$. The decoded data elements may be provided to an output 308.

In accordance with embodiments, the base station 300 performs a joint UE activity detection and data decoding by leveraging:
- the design of the sets $\mathbb{A}^{(n)}$, n=1, ..., N associated with the individual users or UEs $400_1$-$400_N$,
- the structure imposed on the transmit vectors $s^{(n)}$ through the structure of the vectors $c^{(n)}$, and
- the signal sparsity introduced by the sporadic UE activity.

For example, when assuming that the channel coherence bandwidth is larger than the size of the resource block $n_{RB}$, the signal received at the base station may be represented as function of the linear mixture $$y = f(\Sigma_{n=1}^N \lambda_n h_n A^{(n)} c^{(n)} + w)$$

where $\lambda_n \in \{0,1\}$ denotes a user activity and $h_n$ is the unknown channel coefficient between the $UE_n$ and the base station 300. The function $f(\cdot)$ accounts for possible non linearity such as quantization, finite precision and the like.

The base station 300 may perform a compressive-sensing based detection that accounts for the structure of the transmitted signals and for the sparsity of the UE activity pattern. As the information conveyed by the active UEs is contained in the support of the vectors $c^{(n)}$, the base station does not need knowledge of the channel realizations in order to detect active users and their respective data. In other words, no explicit channel estimation is required. In accordance with embodiments, low-complexity detection schemes may be performed which are based on approximate interference techniques, such as approximate message passing or extensions in the form of generalized approximate message passing.

Further embodiments of the present invention provide for a code design or codebook. For example, when considering FIG. 3 the $n^{th}$ UE is uniquely identified by the predefined set $\mathbb{A}^{(n)} = \{a_1^{(n)}, \ldots, a_{M_n}^{(n)}\}$ of size $M_n$. When active, the $UE_n$ transmits a linear combination $s^{(n)}$ of the vectors in the sequence $\mathbb{A}^{(n)}$, meaning that $s^{(n)}$ resides in the subspace spanned by the elements of $\mathbb{A}^{(n)}$, $s^{(n)} \in \text{span}(\mathbb{A}^{(n)})$. This codebook may be used at the UE and at the BS as described above.

In the embodiments above, the UEs are described as transmitting to a single receiver, like the bases station. However, the present invention is not limited to such embodiments, rather, in accordance with other embodiments, the UEs may transmit data to a plurality of base stations.

In the embodiments described so far, the UEs are described as the transmitters, and the bases station is described as the receiver. However, the present invention is not limited to such embodiments, rather, in accordance with other embodiments, the one or more base stations may be the transmitters for transmitting data to one or more UEs being the receivers. Further, the present invention is not limited to base stations as receivers, rather, any other device in the wireless system may act as receiver, like other users in a D2D communication or other machines in a M2M communication. Thus, in accordance with embodiments, the receiver may be one or more of a mobile terminal, an IoT device or a base station of the wireless communication network, and the transmitter may be one of more of a mobile terminal, an IoT device or a base station of the wireless communication network.

As becomes apparent for the above description, specific embodiments of the present invention provide:

- an approach for multiplexing data in accordance with which each transmitter (active or inactive), like a UE, is associated with an exclusively assigned set of multidimensional vectors. Each active transmitter maps its data stream to a multidimensional codeword obtained as a linear combination of multidimensional vectors from its corresponding set. The information is contained in the choice of the vectors to be linearly combined into a subset of the vectors from the associated set, rather than the elements (i.e. the entries) of the resulting multidimensional signal vector. By directly encoding the data to a linear combination of multidimensional vectors, the structured superposition encoding techniques described herein circumvent PAM/BPSK/QPSK/QAM symbol mapping. Moreover, the inventive approach provides multiple access through assigning a different set for each multiplexed layer. The inventive approach does not require channel transmit/receive channel knowledge as the data of each user is encoded in the subspace spanned by the selection of linearly combined vectors rather than the coordinates of the transmit vector. This way of encoding information is invariant to the channel action under the block-fading assumption with coherence length not smaller than the dimension of the transmitted vectors. As such, the inventive approach circumvents the need for performing explicit channel estimation by transmitting pilot sequences. The inventive approach further includes transmitting the multiplexed codewords of the active users over shared resources of a network;
- an approach for random access of active transmitters, where inactive transmitters are considered to send an "all-zero" codeword (i.e. are silent). This corresponds to an inactive user choosing an empty set of vectors (the empty set is mathematically a subset from each set). Based on the multiplexed transmit signal, active user detection is performed at the receiver side based on the association of users with unique sets;
- an approach for receiving data on a signal carrying multiplexed multidimensional vectors. Each of the multiplexed multidimensional vectors represents a linear combination of selected vectors within the set of vectors associated with the corresponding user, with each set being assigned to a different multiplexed layer. The inventive approach further includes identifying the set of linearly combined vectors within the multiplexed codewords by the receiver;
- an approach for designing structured superposition codes which includes generating a plurality of multi-dimensional sets of vectors, and generating a plurality of codebooks from the plurality of multi-dimensional vector sets;

an approach for performing channel estimation. Once the receiver identifies the set of linearly combined vectors within the multiplexed codewords, it may trace back, i.e., estimate the channel coefficients from the received signal vector, under the assumption of a certain channel model (e.g. block fading with additive noise);

an approach for transmitter rate adaptation according to user activity. As the receiver performance trades off the set cardinalities $M_n$, n=1, . . . , N, with the number of active users, the individual data rates (which depend on $M_n$) may be adapted to the expected number of active users, e.g., according to the probability of user activation. For example, with a smaller probability of user activation, the individual data rates may be increased without trading the receiver performance, i.e. reliability;

an approach to communicate non-coherently over point-to-point and multi-user wireless channels, i.e., without instantaneous transmit/receive channel knowledge; and an approach for collision resolution/reduction.

Embodiments of the inventive approach may be applied both for an uplink communication from one or more transmitters, like UEs, to a receiver, like a base station, and for a downlink from a transmitter, like a base station or a UE, to one or more receivers, like UEs.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 5:
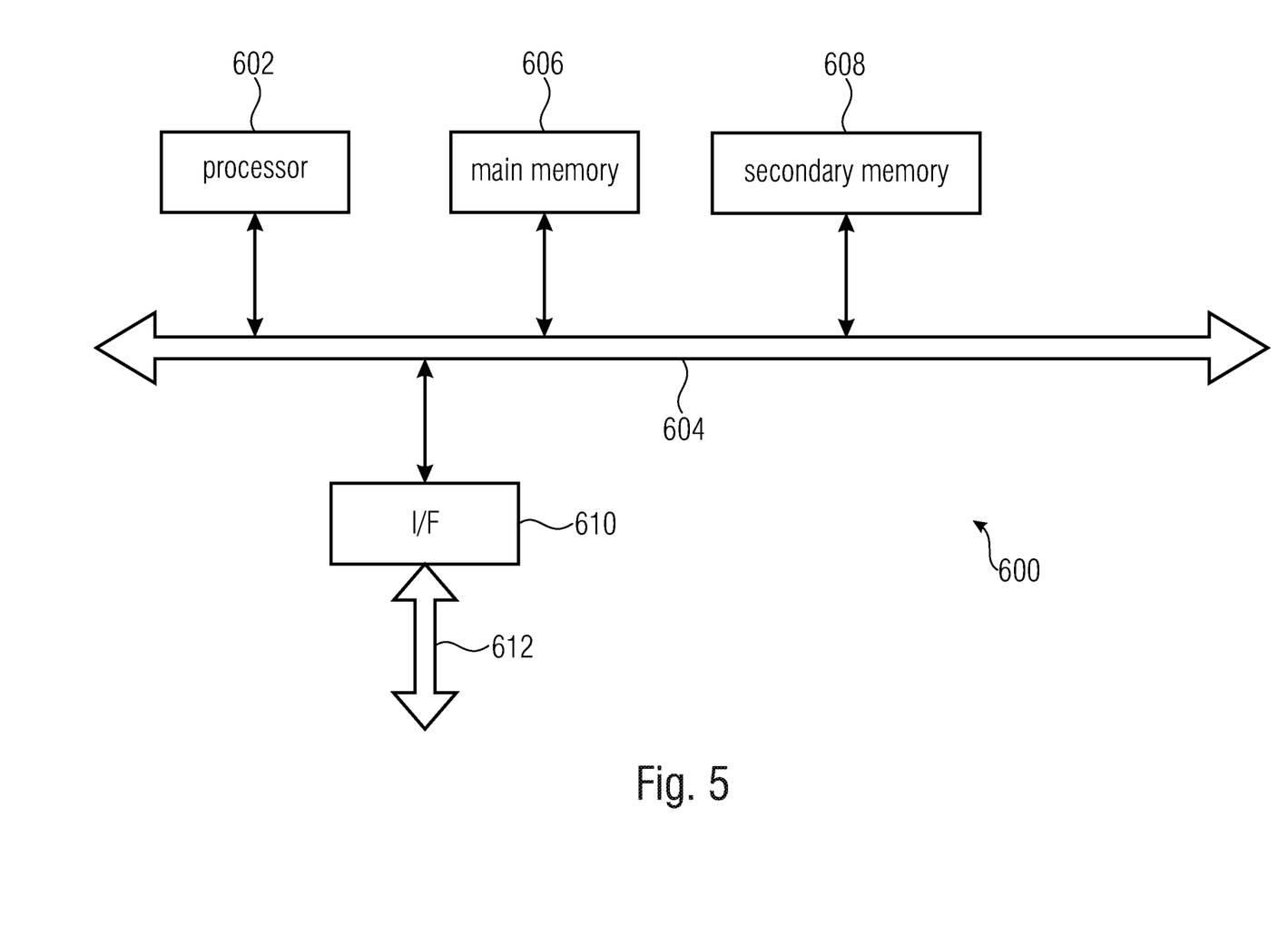
FIG. 5 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 5 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the form electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enable the computer system 600 to implement the present invention. In particular, the computer program, when executed, enable processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Sesia, Stefania, Matthew Baker, and Issam Toufik. "LTE-The UMTS Long Term Evolution: From Theory to Practice," 2nd edition, John Wiley & Sons, 2011
[2] Zhaoyang Zhang, et. al., "Grant-free Rateless Multiple Access: A Novel Massive Access Scheme for Internet of Things," IEEE Communications Letters, Volume: 20, Issue: 10, October 2016, Page(s): 2019-2022
[3] Kelvin Au, et. al., "Uplink Contention Based SCMA for 5G Radio Access," Globecom Workshops (GC Wkshps), 2014, 8-12 Dec. 2014
[4] H. Nikopour and H. Baligh, "Sparse code multiple access," in Proc. IEEE PIMRC, London, pp. 332-336, September 2013,"
[5] B. Wang, L. Dai, T. Mir, and Z. Wang, "Joint User Activity and Data Detection Based on Structured Compressive Sensing for NOMA," IEEE Commun. Lett., vol. 20, no. 7, pp. 1473-1476, July 2016.
[6] B. Wang, L. Dai, Y. Zhang, T. Mir, and J. Li, "Dynamic Compressive Sensing-Based Multi-User Detection for Uplink Grant-Free NOMA," IEEE Commun. Lett., vol. 20, no. 11, pp. 2320-2323, November 2016.
[7] L. Dai, B. Wang, Y. Yuan, S. Han, C. I. I and Z. Wang, "Non-orthogonal multiple access for 5G: solutions, challenges, opportunities, and future research trends," IEEE Commun. Mag, vol. 53, no. 9, pp. 74-81,2015

The invention claimed is:

1. A transmitter for transmitting data to a receiver of a wireless communication network, the wireless communication network comprising a plurality of resource elements, at least a subset of the plurality of resource elements shared by a plurality of transmitters for transmitting data from the plurality of transmitters to the receiver, the transmitter, comprising
at least one antenna,
an encoder configured
to receive a data element to be transmitted to a receiver of the wireless communication network, and
to map the data element to a codeword, the codeword acquired by selecting at least one vector from a unique set of vectors, the unique set of vectors exclusively assigned to the transmitter, each vector comprising a plurality of symbols, each symbol to be transmitted over a resource element of the wireless communication network, and
a transceiver coupled to the encoder and to the antenna, the transceiver configured to transmit via the antenna the codeword on the subset of resource elements, the codeword representing the data element and identifying the transmitter at the receiver,
wherein the encoder is configured to acquire the codeword by selecting and linearly combining a plurality of vectors from the unique set of vectors.

2. The transmitter of claim 1, wherein
the encoder is configured
to receive a data stream comprising a plurality of data elements to be transmitted to the receiver, and
to map each data element to a respective codeword.

3. The transmitter of claim 1, comprising
a storage, the storage configured to store the unique set of vectors,
wherein, responsive to the codeword to be transmitted, the encoder is configured to select one or more vectors from the storage.

4. The transmitter of claim 1, wherein
the combination of the plurality of vectors comprises a subset of the vectors provided in the unique set of vectors.

5. The transmitter of claim 4, wherein
the number of vectors in the subset depends on a transmission rate, and
the transmission rate is set by the receiver dependent on a number of active transmitters in the wireless communication network.

6. The transmitter of claim 1, wherein
the encoder is configured, in case there is no data to be transmitted, to use a predefined vector or to generate a predefined combination of vectors, wherein all transmitters in the wireless communication network transmit the same predefined vector or combination of vectors in case no data is to be transmitted.

7. The transmitter of claim 6, wherein
the predefined vector or predefined combination of vectors comprises one or more all-zero vectors.

8. The transmitter of claim 1, wherein
the transmitter is configured to register with the wireless communication network when establishing or re-establishing a connection to the wireless communication network, the transmitter, responsive to the registration, receiving information indicating the shared resources.

9. The transmitter of claim 1, wherein
the transmitter comprises information indicating the shared resources, and the transmitter access the wireless communication network when establishing or re-establishing a connection to the wireless communication network without performing a registration procedure.

10. A receiver for receiving data from a plurality of transmitters of a wireless communication network, the wireless communication network comprising a plurality of resource elements, at least a subset of the plurality of resource elements provided shared by a plurality of transmitters for transmitting data from the plurality of transmitters to the receiver, the receiver comprising:
at least one antenna,
a transceiver coupled to the antenna, the transceiver configured to receive via the antenna a receive signal on the subset of resource elements, the receive signal comprising a plurality of vectors from a plurality of transmitters, each vector comprising a plurality of symbols, each symbol transmitted over a resource element of the wireless communication network, and
a decoder coupled to the transceiver, the decoder configured
to acquire from the receive signal the plurality of vectors, a vector representing a codeword from a certain transmitter, the vector selected from a unique set of vectors exclusively assigned to the certain transmitter, the unique sets of vectors of the plurality of transmitters being known at the receiver, and to de-map the codewords to data elements associated with the respective transmitters on the basis of the known unique sets of vectors of the plurality of transmitters, wherein one or more codewords from the plurality of transmitters are a linear combination of a plurality of vectors from the unique set of vectors.

11. The receiver of claim 10, configured for a wireless communication with a plurality of transmitters for transmitting data to a receiver of a wireless communication network, the wireless communication network comprising a plurality of resource elements, at least a subset of the plurality of resource elements shared by a plurality of transmitters for transmitting data from the plurality of transmitters to the receiver, the transmitter, comprising at least one antenna,
an encoder configured
to receive a data element to be transmitted to a receiver of the wireless communication network, and
to map the data element to a codeword, the codeword acquired by selecting at least one vector from a unique set of vectors, the unique set of vectors exclusively assigned to the transmitter, each vector comprising a plurality of symbols, each symbol to be transmitted over a resource element of the wireless communication network, and
a transceiver coupled to the encoder and to the antenna, the transceiver configured to transmit via the antenna the codeword on the subset of resource elements, the codeword representing the data element and identifying the transmitter at the receiver.

12. The receiver of claim 10, wherein
the decoder is configured to identify an inactive transmitter not transmitting data responsive to a predefined vector or a predefined combination of vectors, wherein all transmitters in the wireless communication network use the same predefined vector or combination of vectors in case no data is to be transmitted.

13. The receiver of claim 10, comprising
a channel estimator to estimate a state of a radio channel between the transmitters and the receiver,
wherein the channel estimator is configured to estimate the channel coefficients from the received vectors, under the assumption of a certain channel model, like block fading with additive noise.

14. The receiver of claim 10, wherein
the decoder is configured to identify from the number of transmitters a number of active transmitters sending data and a number of inactive transmitters not sending data, and to set a transmission rate for transmitting data from the active transmitters to the receiver, and
the transceiver is configured to signal the transmission rate via the antenna, the active transmitters setting, responsive to the signaled transmission rate, a number of vectors to be linearly combined.

15. The receiver of claim 14, wherein
the number of vectors to be linearly combined comprises only one vector from the unique set of vectors.

16. The receiver of claim 10, wherein
the transmitters are configured to register with the wireless communication network when establishing or re-establishing a connection to the wireless communication network, the receiver is configured to use only the unique sets of vectors of those transmitters that registered with the wireless communication network.

17. The receiver of claim 10, wherein
one or more of the transmitters have associated therewith an activation pattern indicating a probability of activation of the transmitter during a predefined time period, and
for the de-mapping, the receiver is configured to access the unique sets of vectors according to the probabilities of activation of the transmitters, starting with the highest probability.

18. A wireless communication network, comprising:
a plurality of transmitters for transmitting data to a receiver of a wireless communication network, the wireless communication network comprising a plurality of resource elements, at least a subset of the plurality of resource elements shared by a plurality of transmitters for transmitting data from the plurality of transmitters to the receiver, the transmitter comprising:
at least one antenna,
an encoder configured
to receive a data element to be transmitted to a receiver of the wireless communication network, and
to map the data element to a codeword, the codeword acquired by selecting at least one vector from a unique set of vectors, the unique set of vectors exclusively assigned to the transmitter, each vector comprising a plurality of symbols, each symbol to be transmitted over a resource element of the wireless communication network, and
a transceiver coupled to the encoder and to the antenna, the transceiver configured to transmit via the antenna the codeword on the subset of resource elements, the codeword representing the data element and identifying the transmitter at the receiver, and
a receiver of claim 10,
wherein the signals from the plurality of transmitters are multiplexed and transmitted to the transmitter over shared resources of the wireless communication network.

19. The wireless communication network of claim 18, wherein the receiver is a mobile terminal, an IoT device or a base station of the wireless communication network, and wherein the transmitter is a mobile terminal, an IoT device or a base station of the wireless communication network.

20. The communication network of claim 18, using an IFFT (Inverse Fast Fourier Transform) based signal, wherein the IFFT based signal comprises OFDM with CP, DFT-s-OFDM with CP, IFFT-based waveforms without CP, f-OFDM, FBMC, GFDM or UFMC.

21. An apparatus for encoding data elements a transmission from a transmitter to a receiver of a wireless communication network, the wireless communication network comprising a plurality of resource elements, at least a subset of the plurality of resource elements shared by a plurality of transmitters for transmitting data from the plurality of transmitters to the receiver, the apparatus comprising:
a storage device holding a unique set of vectors, the unique set of vectors exclusively assigned to the transmitter, each vector comprising a plurality of symbols, each symbol to be transmitted over a resource element of the wireless communication network, and
an encoder to form a codeword representing a data element to be transmitted, each codeword defined by a vector or by a linear combination of vectors selected from the unique set of vectors, wherein the encoder is configured to acquire the codeword by selecting and linearly combining a plurality of vectors from the unique set of vectors.

22. A method for transmitting data from a transmitter to a receiver of a wireless communication network, the wireless communication network comprising a plurality of resource elements, at least a subset of the plurality of resource elements shared by a plurality of transmitters for transmitting data from the plurality of transmitters to the receiver, the method comprising:

receiving a data element to be transmitted to the receiver of the wireless communication network,     mapping the data element to a codeword, the codeword acquired by selecting at least one vector from a unique set of vectors, the unique set of vectors exclusively assigned to the transmitter, each vector comprising a plurality of symbols, each symbol to be transmitted over a resource element of the wireless communication network, and     transmitting the codeword on the subset of resource elements, the codeword representing the data element and identifying the transmitter at the receiver,     wherein the codeword is acquired by selecting and linearly combining a plurality of vectors from the unique set of vectors.

23. A method for receiving data from a plurality of transmitters at a receiver of a wireless communication network, the wireless communication network comprising a plurality of resource elements, at least a subset of the plurality of resource elements shared by a plurality of transmitters for transmitting data from the plurality of transmitters to the receiver, the method comprising:

receiving a receive signal on the subset of resource elements, the receive signal comprising a plurality of vectors from a plurality of transmitters served by the receiver, each vector comprising a plurality of symbols, each symbol transmitted over a resource element of the wireless communication network,     acquiring from the receive signal the plurality of vectors, a vector representing a codeword from a certain transmitter, the vector selected from a unique set of vectors exclusively assigned to the certain transmitter, the unique sets of vectors of the plurality of transmitters being known at the receiver, and     de-mapping the codewords to data elements associated with the respective transmitters on the basis of the known unique sets of vectors of the plurality of transmitters,     wherein one or more codewords from the plurality of transmitters are a linear combination of a plurality of vectors from the unique set of vectors.

24. A non-transitory digital storage medium having stored thereon a computer program for performing a method for transmitting data from a transmitter to a receiver of a wireless communication network, the wireless communication network comprising a plurality of resource elements, at least a subset of the plurality of resource elements shared by a plurality of transmitters for transmitting data from the plurality of transmitters to the receiver, the method comprising:

receiving a data element to be transmitted to the receiver of the wireless communication network,     mapping the data element to a codeword, the codeword acquired by selecting at least one vector from a unique set of vectors, the unique set of vectors exclusively assigned to the transmitter, each vector comprising a plurality of symbols, each symbol to be transmitted over a resource element of the wireless communication network, and     transmitting the codeword on the subset of resource elements, the codeword representing the data element and identifying the transmitter at the receiver,     wherein the codeword is acquired by selecting and linearly combining a plurality of vectors from the unique set of vectors,     when said computer program is run by a computer.

25. A non-transitory digital storage medium having stored thereon a computer program for performing a method for receiving data from a plurality of transmitters at a receiver of a wireless communication network, the wireless communication network comprising a plurality of resource elements, at least a subset of the plurality of resource elements shared by a plurality of transmitters for transmitting data from the plurality of transmitters to the receiver, the method comprising:

receiving a receive signal on the subset of resource elements, the receive signal comprising a plurality of vectors from a plurality of transmitters served by the receiver, each vector comprising a plurality of symbols, each symbol transmitted over a resource element of the wireless communication network,     acquiring from the receive signal the plurality of vectors, a vector representing a codeword from a certain transmitter, the vector selected from a unique set of vectors exclusively assigned to the certain transmitter, the unique sets of vectors of the plurality of transmitters being known at the receiver, and     de-mapping the codewords to data elements associated with the respective transmitters on the basis of the known unique sets of vectors of the plurality of transmitters,     wherein one or more codewords from the plurality of transmitters are a linear combination of a plurality of vectors from the unique set of vectors,     when said computer program is run by a computer.

\* \* \* \* \*